US011082321B1

(12) United States Patent
Hulin

(10) Patent No.: US 11,082,321 B1
(45) Date of Patent: Aug. 3, 2021

(54) GOSSIP-STYLE DATABASE MONITORING

(71) Applicant: Amazon Technologies, Inc., Seattle, WA (US)

(72) Inventor: Matthew Kyle Hulin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 397 days.

(21) Appl. No.: 14/740,218

(22) Filed: Jun. 15, 2015

(51) Int. Cl.
*H04L 12/26* (2006.01)

(52) U.S. Cl.
CPC ............ *H04L 43/106* (2013.01); *H04L 43/16* (2013.01)

(58) Field of Classification Search
CPC ... H04L 43/106; H04L 43/16; H04L 67/1002; H04L 67/1061; H04L 67/1095
See application file for complete search history.

(56) References Cited

U.S. PATENT DOCUMENTS

| | | | | |
|---|---|---|---|---|
| 5,881,311 | A * | 3/1999 | Woods .................. | G06F 3/0607 710/3 |
| 6,701,449 | B1 * | 3/2004 | Davis .................. | H04L 41/0677 714/4.11 |
| 7,133,891 | B1 * | 11/2006 | Uceda-Sosa ........ | H04L 67/1008 709/201 |
| 7,536,693 | B1 * | 5/2009 | Manczak ............. | G06F 3/061 709/226 |
| 8,085,768 | B1 * | 12/2011 | Hui ........................ | H04L 45/18 370/389 |
| 8,458,517 | B1 * | 6/2013 | Vermeulen .......... | G06F 11/1474 709/201 |
| 8,788,647 | B1 * | 7/2014 | Nolle ............... | H04N 21/23805 709/223 |
| 10,545,994 | B2 * | 1/2020 | Chen ....................... | G06F 3/065 |
| 2001/0029502 | A1 * | 10/2001 | Oeda ..................... | G06F 16/256 |
| 2004/0019614 | A1 * | 1/2004 | Wang ................ | G06F 17/30575 |
| 2008/0126492 | A1 * | 5/2008 | Guidi .................... | H04L 43/103 709/206 |
| 2010/0077035 | A1 * | 3/2010 | Li ........................... | H04L 67/02 709/206 |
| 2010/0080144 | A1 * | 4/2010 | Greenberg .......... | H04L 12/1863 370/253 |

(Continued)

OTHER PUBLICATIONS

Voormedia, "Distributed Server Monitoring using Gossiping," Dec. 19, 2014, http://voormedia.com/blog/2014/12/distributed-server-monitoring-using-gossiping.*

(Continued)

*Primary Examiner* — John A Follansbee
*Assistant Examiner* — Lam T Do
(74) *Attorney, Agent, or Firm* — Davis Wright Tremaine LLP

(57) ABSTRACT

The present document describes systems and methods that monitor the health of a number of network-connected databases. In various embodiments, a health management subsystem measures one or more health parameters of a database and determines whether the database is operating properly. When the database is operating properly, a heartbeat associated with the database is generated. Heartbeat information is exchanged with other health management subsystems using a gossip-style protocol. Using the received and generated heartbeats, a health state table is provided that includes a health state for each database.

20 Claims, 9 Drawing Sheets

(56) References Cited

U.S. PATENT DOCUMENTS

| | | | | |
|---|---|---|---|---|
| 2010/0274983 | A1* | 10/2010 | Murphy | G06F 11/1456 |
| | | | | 711/162 |
| 2011/0105155 | A1* | 5/2011 | Bienas | H04W 48/16 |
| | | | | 455/458 |
| 2013/0006933 | A1* | 1/2013 | Holden | G06F 16/273 |
| | | | | 707/634 |
| 2013/0275373 | A1* | 10/2013 | Uola | H04L 67/1095 |
| | | | | 707/634 |
| 2013/0336104 | A1* | 12/2013 | Talla | H04L 45/245 |
| | | | | 370/216 |
| 2014/0086097 | A1* | 3/2014 | Qu | H04L 45/026 |
| | | | | 370/254 |
| 2015/0100617 | A1* | 4/2015 | Diederich | H04L 67/1097 |
| | | | | 709/201 |
| 2017/0091228 | A1* | 3/2017 | Middlekauff | G06F 17/30289 |

OTHER PUBLICATIONS

Subbiah, Arun, Blough, D.M., "Distributed Diagnosis in Dynamic Fault Environments;" Mar. 30, 2004, http://ieeexplore.ieee.org/abstract/document/1278102/.*

Van Renesse, R., et al., "A Gossip-Style Failure Detection Service," Proceedings of the IFIP International Conference on Distributed Systems Platforms and Open Distributed Processing, Sep. 1, 1998, The Lake District, United Kingdom, 16 pages.

* cited by examiner

Health State Table (302)

| Network Address | Heartbeat Value | Update Time | Status |
|---|---|---|---|
| 128.106.38.49 | 34123 | May 3, 2015 12:45:21 | OK |
| 128.0.164.1 | 32412 | May 3, 2015 12:43:44 | OK |
| 128.104.38.49 | 12432 | May 3, 2015 12:45:21 | OK |
| 128.104.38.51 | 2341 | May 3, 2015 12:43:44 | OK |
| 169.0.23.1 | 23414 | May 3, 2015 11:57:23 | OK |
| 169.0.23.43 | 3423 | May 3, 2015 12:32:01 | OK |
| 92.43.213.4 | 2344 | May 3, 2015 10:45:01 | INC |

FIG. 3

GOSSIP-STYLE DATABASE MONITORING

BACKGROUND

Database systems are an important part of many large service providers. In certain environments, when large-scale services are provided, database replication may be used to support large numbers of clients. For example, in some environments, a number of slave databases are linked to a master database, and data from the master database is replicated to the slave databases via a network. When the contents of the master database change, the changed contents are forwarded to and synchronized with the slave databases. In another example, a collection of databases synchronize data with each other, and changes to data within a particular database in the collection of databases are propagated across the collection of databases. Eventually, in most situations, data is replicated across the collection of databases, and the collection of databases enters a synchronized state. When a particular database experiences a failure, data may not be propagated properly across the collection of databases, and a replication failure occurs. In some systems, these failures can result in a cascading sequence of related failures that can be difficult to monitor, report, and analyze.

BRIEF DESCRIPTION OF THE DRAWINGS

Various embodiments in accordance with the present disclosure will be described with reference to the drawings, in which:

FIG. 3 shows an illustrative example of a health state table, in accordance with an embodiment;

DETAILED DESCRIPTION

Figure 1:
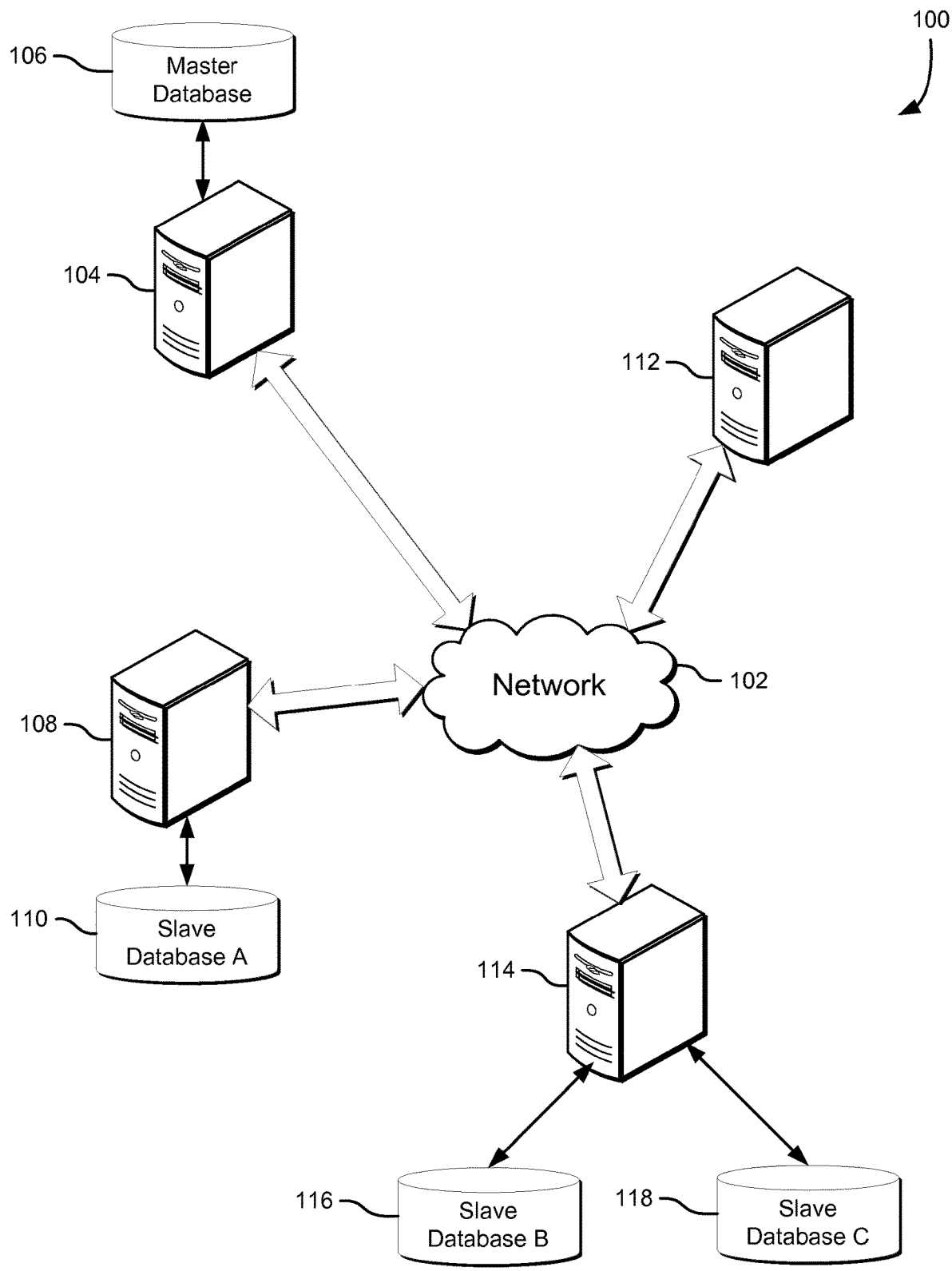
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods that monitor the operational health of a number of databases. In one embodiment, a collection of network-connected database servers each host one or more databases. Each particular database server includes a health management subsystem for each database hosted by the particular database server. Each health management subsystem measures health information for an associated database. For example, in one implementation, the health management subsystem measures the state of data replication between the associated database and another network-connected master database. In another implementation, the health management subsystem measures database load. In yet another implementation, the health management subsystem monitors the database for deadlock. In yet another implementation, the health management subsystem monitors the database for memory, disk, and processor usage. When the associated database is operating within operational parameters, the health management subsystem produces a heartbeat for the associated database. A health state table retains a list of databases, with associated heartbeat values, and last-update times. When the heartbeat is produced by the health management subsystem, a health state table entry for the database is updated by incrementing an associated heartbeat value, and updating a last-update time to the current time.

In various embodiments, the health state table is synchronized and merged with other health state tables maintained by other database servers using a gossip-style protocol. In a collection of network-connected database servers, each database server periodically chooses another database server with which to communicate. In some implementations, the other database server is chosen using a pseudorandom method. In another implementation, the other database server is chosen by iterating through a list of servers. In another implementation, each database server additionally periodically communicates with multiple other database servers. In yet another implementation, each database server additionally periodically chooses to broadcast to a number of database servers. Information from the health state table is transmitted over the network by a health reporting module to the chosen one or more database servers.

In various embodiments, when a database server receives health state table information from another database server, the health state table information is merged and synchronized with a local health state table. A health monitoring module on the database server receives health state table information. The health state table information is merged with the local health state table by, for each entry in the table, updating the heartbeat value if the received heartbeat for a particular database is greater than the corresponding heartbeat in the local health state table. When a heartbeat in the local health state table is updated, the update time is recorded.

Once the received health state table information is merged with the local health state table, the local health state table may be updated. In various implementations, a health state update module examines the entries in the local health state table for databases where an updated heartbeat has not been received for a threshold amount of time. When a heartbeat has not been received for a threshold amount of time, a status value in the local health state table is set to an incommunicado value. Entries in the local health state table that are set to an incommunicado value are retained until a heartbeat has not been received for an additional amount of time, after which the entries are removed from the table. In one implementation, health state table entries that are in an incommunicado state are retained for at least the threshold amount of time. In some situations, retaining health state table entries in an incommunicado state for an additional amount of time allows the system to reject out-of-date heartbeat information provided by other gossiping database servers that have not yet placed the particular health state table entry in an incommunicado state. A particular health state table entry that is in an incommunicado state may return to an operational state when a more recent heartbeat is received by the health monitoring module. In various implementations, entries in the local health state table that remain in an incommunicado state for an amount of time are removed from the table.

In various embodiments, the local health state table accumulates and updates health information for a number of network-connected databases. When a failure occurs somewhere in the system of network connected databases, a system administrator can consult the local health state table to acquire a reasonably current and comprehensive overview of system health. For example, in some implementations, when replication functionality stops working between a particular master database and a slave database, an agent on the slave database detects the failure by monitoring, on the slave database, a timestamp that is replicated from the master database. When the difference between the monitored timestamp and the current time exceeds a threshold value, the agent determines that replication has failed. As a result, the agent ceases generating new heartbeat values. The heartbeat values transmitted by the health management subsystem stop changing, and over time, become stale. Since none of the health management subsystems receive updated heartbeats, they determine, over time, that the replication process represented by the heartbeat has failed when a heartbeat update time is older than a failure threshold value. In some embodiments, the failure threshold is equal to the incommunicado threshold. In other embodiments, the failure threshold is specific to the replication process being monitored, and is less than the incommunicado threshold. The health management subsystem accumulates, over time, a table or other data structure that includes the heartbeat values and heartbeat update times of other agents within other health management systems. The table or other data structure provides the database administrator with an overview of the status of replication operations across a number of databases.

FIG. 1 shows an illustrative example of an environment in which various embodiments may be practiced. A diagram 100 illustrates a number of database servers interconnected over a network 102, with each database server connected to a database. A master database server 104 maintains a master database 106. In various implementations, the master database server 104 maintains data tables on the master database 106 that are replicated to various slave databases. The operational status of the replication is monitored, in some implementations, by a process executing on the master database server 104 that periodically writes a current time value into the master database 106. The periodicity with which the process writes the current time limits the accuracy with which replication delay can be measured. For example, in some implementations, when the current time is written to the master database 106 each second, the measured replication delay can be up to one second longer than the actual replication delay.

In various embodiments, data is replicated from the master database 106 to the slave databases. In some implementations, the written current time value in the master database 106 is replicated to the various slave databases by data-replication processes executing on the database servers. In most environments, the data-replication processes are part of a commercial database product. Replication monitoring agents on the various slave database servers monitor the time value that is replicated to their respective slave databases, and by comparing the time value to a current time, determine an amount of replication delay between the master database 106 and the respective slave databases. When the amount of replication delay exceeds a threshold value, the replication process is determined to have failed. The threshold value can be determined by adding the periodicity with which the master database writes the replicated timestamp into the master database and the maximum allowable replication delay. For example, in a particular environment, a first slave database server 108 is connected to a slave database A 110. Data from the master database 106 is replicated to the slave database A 110 via the network 102. An amount of replication delay is measured by an agent on the first slave database server 108 by monitoring the replicated time value that was written by the master database server 104 into the master database 106, and then replicated to the slave database A 110. When the replicated time value stored in the slave database A 110 is compared to a current time, an indication of the amount of replication delay between the master database 106 and the slave database A 110 is produced. When the indicated replication delay exceeds the threshold value, the agent on the first slave database server 108 determines that replication from the master database 106 to the slave database A 110 has failed.

In various embodiments, health state information is shared between database servers using a gossip-style protocol. For example, in various implementations, each database server monitors level replication operations, and updates health information in a local health state table. Information in the local health state table is shared and merged with health information from other database servers. In many scenarios, over a period of time, the local health state information maintained by each database server acquires the database replication status of a number of the database servers in the system.

An example of a gossip-style protocol is described by Van Renesse, Robbert, Yaron Minsky, and Mark Hayden, "A Gossip-Style Failure Detection Service," In Middleware '98, pp. 55-70, Springer London, 1998, which is incorporated herein by reference.

In some embodiments, an optional standalone health server 112 is used for maintaining and distributing system health information. Standalone health server 112 receives health information from various database servers in the system, merges and synchronizes the received health information in a health state table, and transmits the merged and synchronized health information to other database servers and the system. The standalone health server 112 does not originate health information that is added to the health state table. In some environments, the standalone health server 112 is positioned within the typology of the network 102 to mitigate the risk of a network partition failure that would cause the collection of health information to fail.

In particular embodiments, a multi-database server 114 maintains a slave database B 116 and a slave database C 118. In some implementations, a single replication monitoring agent on the multi-database server 114 monitors the replication status of the slave database B 116 and the slave database C 118. The single replication monitoring agent updates a single health state table which is synchronized with other database servers connected via the network 102. In another implementation, separate replication monitoring agents on the multi-database server 114 monitor the replication status of each database.

In some embodiments, the replication status of a particular database is determined by measuring a replication delay for more than one replication path. For example, the slave database A 110 may replicate information from the master database 106 and the slave database B 116. The replication status of the slave database A 110 is determined by measuring the replication delay for each replication path. Both the master database server 104 and the slave database server 108 run processes that write the current time value to the master database 106 and the slave database B 116 respectively. The time values are replicated to the slave database A 110, where the time values are compared to the current time on slave database server 108. When the determined replication delays are less than their respective maximum threshold values, replication operations for slave database A 110 are determined to be working.

The above examples illustrate that any number of health-monitoring agents, or even no agents, may be configured to update a given health state table. The mechanisms for updating and synchronizing health state tables across the system can be integrated with the systems or servers that generate various health state data, or in certain implementations, may be separate from the servers and systems that generate the various health state data.

Figure 2:
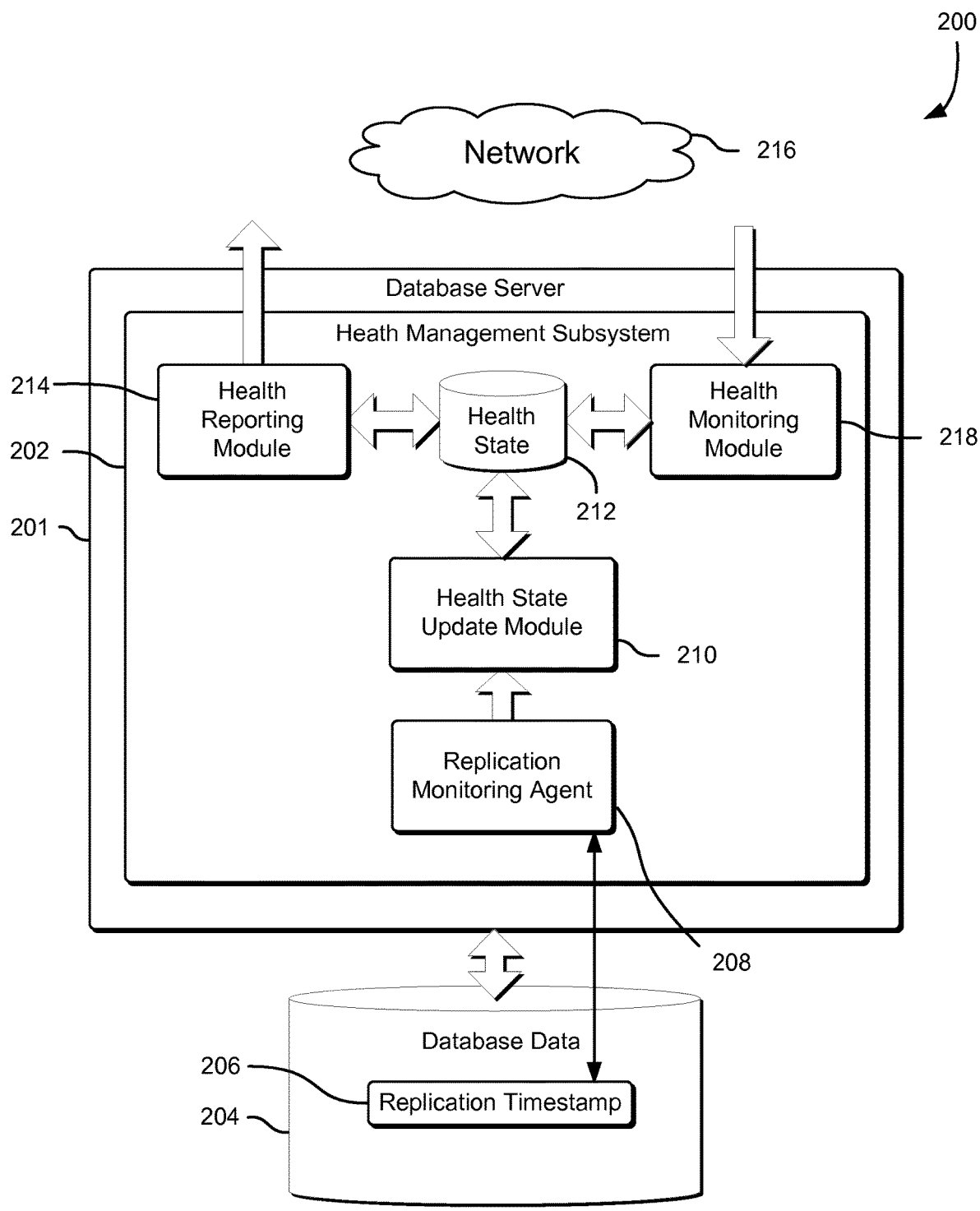
FIG. 2 shows an illustrative example of a database server with a health management subsystem, in accordance with an embodiment.

FIG. 2 shows an illustrative example of a database server with a health management subsystem, in accordance with an embodiment. The illustrated modules and agents represent executable code modules that are executed by a processor to provide various functionality to the database server. A block diagram 200 shows a database server 201 that includes a health management subsystem 202. The database server 201 maintains a database 204. The database 204 may maintain various application and user data, and includes a replication timestamp data cell 206. The replication timestamp data cell 206 has a value that is obtained by replicating the contents of a master replication timestamp data cell on a master database server. The master database server periodically writes the current time to the master replication timestamp data cell. Replication mechanisms provided by the master database server and the database server 201 replicate the value of the master replication timestamp data cell to the replication timestamp data cell 206. A replication monitoring agent 208 in the health management subsystem 202 periodically reads the value of the replication timestamp data cell 206. A replication delay is determined by calculating the difference between the value of the replication timestamp data cell 206 and the current time as measured on the database server 201. When the difference between the current time and the value of the replication timestamp data cell 206 is less than a threshold value, the replication monitoring agent 208 determines that data replication between the master database and the database server 201 is functioning properly and generates a heartbeat indication for the replication functionality of the database 204. In various implementations, the generated heartbeat causes a heartbeat value to be incremented, and a heartbeat-update time to be recorded. When the difference between the current time value and the value of the replication timestamp data cell 206 is greater than or equal to a threshold value, the replication monitoring agent 208 determines that the data replication between the master database and the database server 201 is not functioning properly and does not generate a heartbeat indication.

In some embodiments, the replication monitoring agent 208 monitors a replication timestamp data cell 206 whose value includes a threshold amount of time determined on a master database server. In one example, an agent running on the master database server writes a master timestamp cell with a value that is determined by adding the threshold amount of time to the current time. In some implementations, the master timestamp cell is written by the replication monitoring agent 208. The master timestamp cell is replicated to the replication timestamp data cell 206 on the database server 201. The replication monitoring agent 208 compares the value of the replication timestamp data cell 206 to the current time, and when the current time is later than the value of the replication timestamp data cell 206, replication is determined to not be functioning properly, and a heartbeat is not generated.

In another embodiment, the replication monitoring agent 208 running on a slave database server writes a particular value to a master cell on a remote master database server. When the replication monitoring agent 208 writes the particular value, a replication-start time is recorded to note the start of the replication process. The replication monitoring agent 208 monitors a replication data cell on the slave database server. The particular value is replicated to the replication data cell on the slave database server using the replication features of the master database server and the slave database server. When the replication monitoring agent 208 detects that the replication data cell has received the particular value from the master cell on the remote master database server, the replication monitoring agent 208 compares the current time to the replication-start time. When the difference between the current time and the replication start time is less than a threshold value, the replication monitoring agent 208 determines that the replication functionality is operating properly, and generates a heartbeat. When the difference between the current time and the replication start time is greater than a threshold value, the replication monitoring agent 208 determines that the replication functionality is not operating properly, and does not generate a heartbeat.

In some implementations, when the replication monitoring agent 208 generates a heartbeat indication, the replication monitoring agent 208 provides the heartbeat indication to a health state update module 210. The health state update module 210 updates a health state table 212 to reflect heartbeat indications from the replication monitoring agent. In additional implementations, the health state update module 210 updates the health state table 212 to reflect heartbeat indications from additional monitoring agents such as bandwidth monitoring agents, database load monitoring agents, storage monitoring agents, or other monitoring agents. For each indicated heartbeat, the health state update module 210 locates an associated health state record in the health state table of the database 204. If no associated health state record is found in the health state table 212, a new health state record is created. For each associated health state record, the health state update module 210 increments an associated heartbeat field in the health state table 212, and sets an associated update time field to the current time.

In various embodiments, the health state update module 210 updates the health state records in the health state table 212. For each record in the health state table 212, the health state update module 210 compares the current time to an update time field of the record. When the difference between the current time and the update time exceeds a threshold value, the health state update module 210 determines that the database and agent associated with the record are in a failure state, and sets the status field of the record to an incommunicado value. In various implementations, records that have a status field with an incommunicado value are retained in the health state table 212 for an amount of time before they are removed from the health state table 212. In a particular implementation, incommunicado records are removed from the health state table 212 when the difference between the current time and the update time for the record is greater than twice the threshold value. In another implementation, two threshold values, an incommunicado threshold and a removal threshold, control a status value of a particular health state record. The removal threshold is greater than the incommunicado threshold. When the difference between the current time and the update time is less than the incommunicado threshold, the status value of the particular health state record is "OK." When the difference between the current time and the update time is greater than or equal to the incommunicado threshold, but less than the removal threshold, the status value of the particular health state record is "incommunicado." When the difference between the current time and the update time is greater than or equal to the removal threshold, the particular health state record may be removed by the health state update module 210 or by another process. For example, when the incommunicado threshold is 5 seconds and the removal threshold is 20 seconds, and a particular heartbeat stops being received by the health management subsystem, after five seconds, a health state associated with the particular heartbeat will change to "incommunicado". After 20 seconds, the health state record associated with the particular heartbeat will be removed.

In various embodiments, the health management subsystem 202 includes a health reporting module 214 that reads health state information from the health state table 212 and transmits the health state information via a network 216 to one or more health management subsystems. In some implementations, health state information is transmitted to another health management subsystem running on the database server via interprocess communication. In some embodiments, as a preliminary operation, the health reporting module 214 causes the health state update module 210 to update the health state table 212 before transmitting health information. In various embodiments, the health reporting module 214 acquires, from the health state table 212, the heartbeat value and the network address of each reporting health management subsystem that has an "OK" status value or other value that indicates proper operation. The health reporting module 214 selects a network address from the acquired set of network addresses. In some implementations, the network address is randomly selected from the acquired set of network addresses. In another implementation, the network address is selected sequentially from the acquired set of network addresses. The acquired heartbeat values and network addresses are transmitted by the health reporting module 214 to the selected network address.

In some implementations, a set of network addresses called a clique is maintained in a list by the health management subsystem 202. Network addresses may be selected pseudo-randomly from the clique by the health reporting module 214. In such implementations, the acquired heartbeat values and a set of heartbeat identifiers can be transmitted by the health reporting module 214 to the selected network address.

In some embodiments, the health reporting module periodically broadcasts the acquired heartbeat values and network addresses over the network 216. In another embodiment, the health reporting module transmits the acquired heartbeat values and network addresses to a plurality of network addresses selected from the set of acquired network addresses using a network multicast function. Such multicast or broadcast transmissions can occur periodically in time, periodically based on a number of intervening point-to-point transmissions, or in response to a particular triggering condition. For example, in one implementation, when the health reporting module 214 determines that the number of entries in the health state table 212 is less than a threshold number of entries, the set of heartbeat values is broadcast over a portion of the network 216. A broadcast transmission may be directed to an entire addressable space, or a portion of the addressable space, by using a subnet mask. In some implementations the heartbeat values are broadcast to only the subnet where the health reporting module 214 is connected.

In various embodiments, the health management subsystem 202 includes a health monitoring module 218 that receives messages via the network 216 which includes health state information. For example, in one implementation, the health monitoring module 218 receives a set of network addresses and heartbeat values. For each network address, the health monitoring module 218 locates a corresponding record in the health state table 212. If the health state table 212 does not contain a corresponding record, a new record is created and initialized with the received address, heartbeat value, and current time. If the health state table 212 does contain a corresponding record, the health monitoring module 218 determines if the received heartbeat is greater than the corresponding heartbeat in the health state table 212, and if so, updates the corresponding record's heartbeat value in the health state table 212, and sets the corresponding record's update time to the current time.

In some embodiments, a particular database server manages more than one database. In such embodiments, the particular database server can host a health management subsystem for each managed database, or a health management subsystem can host a replication monitoring agent for each managed database. When multiple health management subsystems are hosted by a single server, each health management subsystem is linked to a different network address on the single server. For example, in a TCP/IP network, a first health management subsystem may be bound to an address of 128.104.38.49:42, and a second health management subsystem may be bound to an address of 120.104.38.49:43. When multiple replication monitoring agents are included in a single health management subsystem, the health information collected by the multiple replication monitoring agents can be combined into a single heartbeat indication that is sent to the health state update module 210. In other implementations when multiple replication monitoring agents are included in a single health management subsystem, each replication monitoring agent can generate a heartbeat with a different heartbeat identifier. The heartbeats are processed by the health state update module 210 and recorded in the health state table 212 along with the different heartbeat identifiers.

FIG. 3 shows an illustrative example of a health state table, in accordance with an embodiment. A table diagram 300 shows a health state table 302 having four columns. The health state table 302 may be implemented using a relational database, or may be programmed using an array, a tree, or a hash table of row structures. Each row of the health state table 302 represents a particular health management subsystem. In some implementations, each row of the health state table 302 represents a particular replication monitoring agent of a particular health management subsystem. An address field 304 retains a network address for the particular health management subsystem. In some implementations, the network address is stored as a numerical IP address. In another implementation, the network address is represented as a partial hostname, full hostname, IPv6 address, IPX address or other network identifier. A heartbeat value field 306 retains the heartbeat value for the particular health management subsystem. In some implementations, the heartbeat value is an integer that is incremented when heartbeat indications are generated by a particular monitoring agent. In another implementation, the heartbeat value can be implemented as any comparable value, which is increased or decreased when the particular monitoring agent generates an associated heartbeat indication. An update time field 308 retains the most recent time that the associated heartbeat value was increased. Heartbeat values can be increased when a heartbeat indication is generated by a monitoring agent, or when a heartbeat indication is received by a health monitoring module. A status field 310 records the current health status of the particular health management subsystem. When the particular health management subsystem is healthy, the status field for the record is "OK" or another value to indicate proper operation. When the particular health management subsystem fails, the status field for the record is set to "INC" or "incommunicado" to represent that the particular health management subsystem is no longer communicating. In various implementations, the status field 310 may be implemented using a character string, a bit field, or an enumeration.

In various implementations, records may be added or removed from the health state table 302. In some implementations, after a record has been in the "INC" or "incommunicado" state for an amount of time, the record is deleted from the health state table 302. In another implementation, when a heartbeat is received from a new address that is not represented in the health state table 302, an additional row is added to the health state table having the new address, the received heartbeat value, an update time that represents the current time, and an initial status of "OK." To improve performance, the health state table 302 may be indexed by the address field 304 in order to, in part, facilitate synchronizing with received health information from other health management subsystems.

Figure 4:
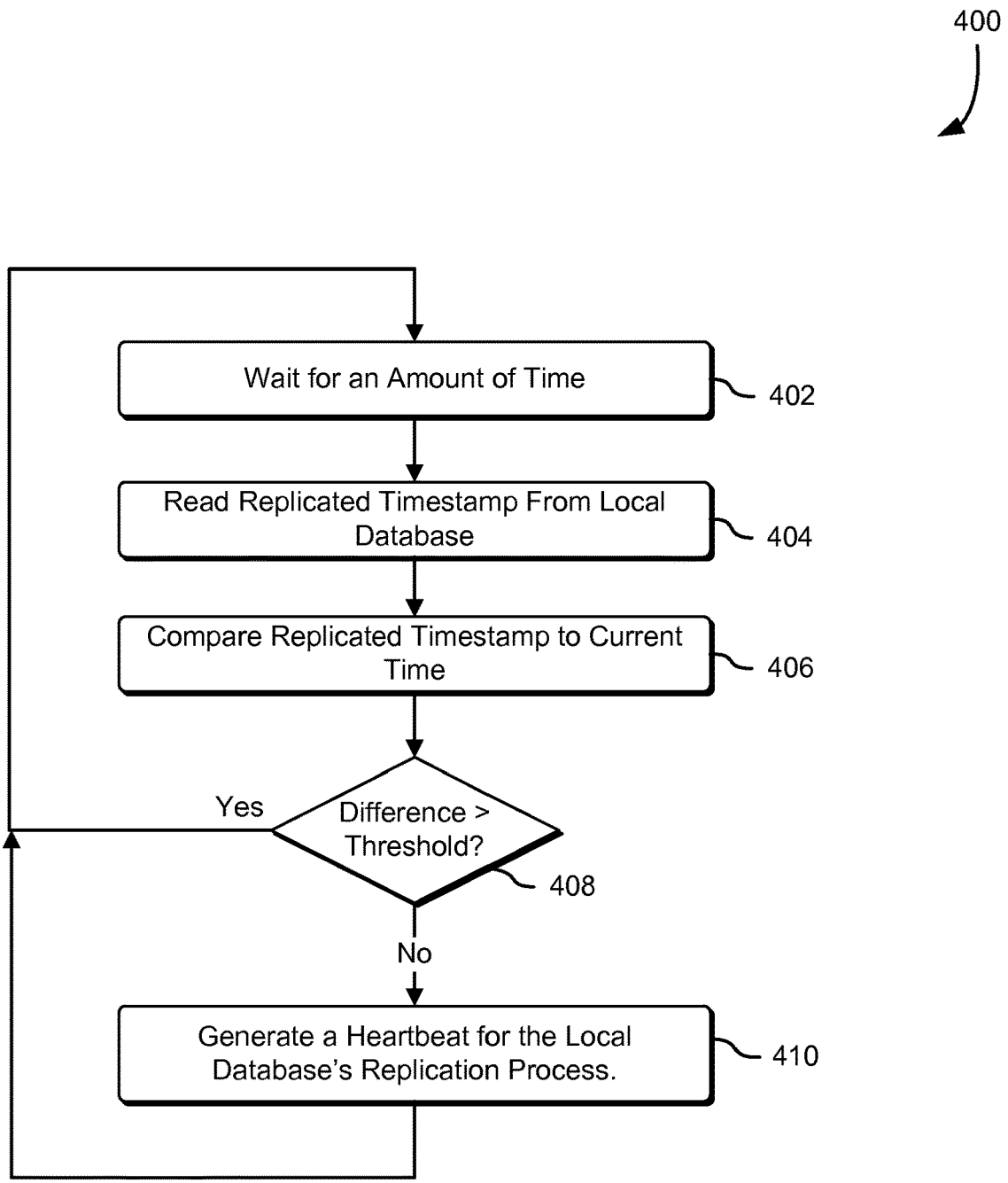
FIG. 4 shows an illustrative example of a process that, when performed by a replication monitoring agent, determines whether database replication is operating properly in accordance with an embodiment.

FIG. 4 shows an illustrative example of a process that, when performed by a replication monitoring agent, determines whether database replication is operating properly in accordance with an embodiment. A process diagram 400 illustrates a process that begins at block 402 where the replication monitoring agent waits for an amount of time. The amount of time can be adjusted to alter the periodicity with which the replication monitoring agent determines whether database replication is functioning properly. For example, in an environment where the remaining steps in the illustrated process use less than a few seconds to execute, and the desired periodicity is greater than one minute, the monitoring period is roughly equal to the amount of time that the replication monitoring agent waits in block 402. In some implementations the amount of time is in the range of 1 to 5 minutes. In another implementation, the amount of time is determined based at least in part on the maximum allowable replication delay allowed before the replication monitoring agent determines that database replication has failed. For example, in some implementations, when the maximum allowable replication delay is 10 seconds, the monitoring period is roughly equal to twice the maximum allowable replication delay, or 20 seconds.

At block 404, the replication monitoring agent reads a replicated timestamp from a local database. In various implementations, the replicated timestamp is a value written by an agent on a master database server. The agent on the master database server periodically writes the current time into a particular cell in a master database. The particular cell in the master database is replicated into a corresponding cell in a local database, and the replicated timestamp is read from the corresponding cell. At block 406, the replicated timestamp is compared to the current time. The difference between the replicated timestamp and the current time is representative of the amount of delay in the database replication process between the master database and the local database.

When the difference between the current time and the replicated timestamp is less than or equal to a threshold value, the replication monitoring agent determines 408 that the replication process between the master database and the local database is functioning properly. As a result, at block 410, the replication monitoring agent generates a heartbeat for the replication process between the master database and the local database. The process of generating a heartbeat identifies, in a health state table, a particular record that retains the heartbeat information that is associated with the replication process between the master database and the local database. For the particular record, a heartbeat field is incremented and an update time field is set to a current time. In some implementations, generating a heartbeat causes a health state update module to update the health status fields of the health state table. Once the heartbeat is generated, execution returns to block 402 and the replication monitoring agent waits before rereading the replicated timestamp.

When the difference between the current time and the replicated timestamp is greater than the threshold value, the replication monitoring agent determines 408 that the replication process between the master database and the local database has failed. Execution returns to block 402 where the replication monitoring agent waits before rereading the replicated timestamp.

In some implementations, when the replication monitoring agent determines that the replication process between the master database and the local database has failed, the replication monitoring agent notifies a health state update module which updates a health state table to reflect that the replication process between the master database and the local database has failed. For example, in some implementations, a health state record associated with the replication process between the master database and the local database is set to an incommunicado state so that heartbeats for the field replication process will not be transmitted to other health management subsystems.

In some embodiments, the replication monitoring agent monitors more than one replicated cell in the local database. Each monitored cell is written by a different master database server. When the difference between the timestamps contained in the monitored cells in the current time is less than a threshold value, replication between the different master database servers and the local database is determined to be functioning properly. In some implementations the threshold value is specific to each different master database server. For example, in one implementation, a first master database server has a maximum threshold of 10 seconds, a second master database server has maximum threshold of 15 seconds, and a third master database server has a maximum threshold of 20 seconds. In various implementations, the monitoring of multiple replication cells can be merged into a single health state, or reported separately using separate heartbeats or even separate replication monitoring agents.

Figure 5:
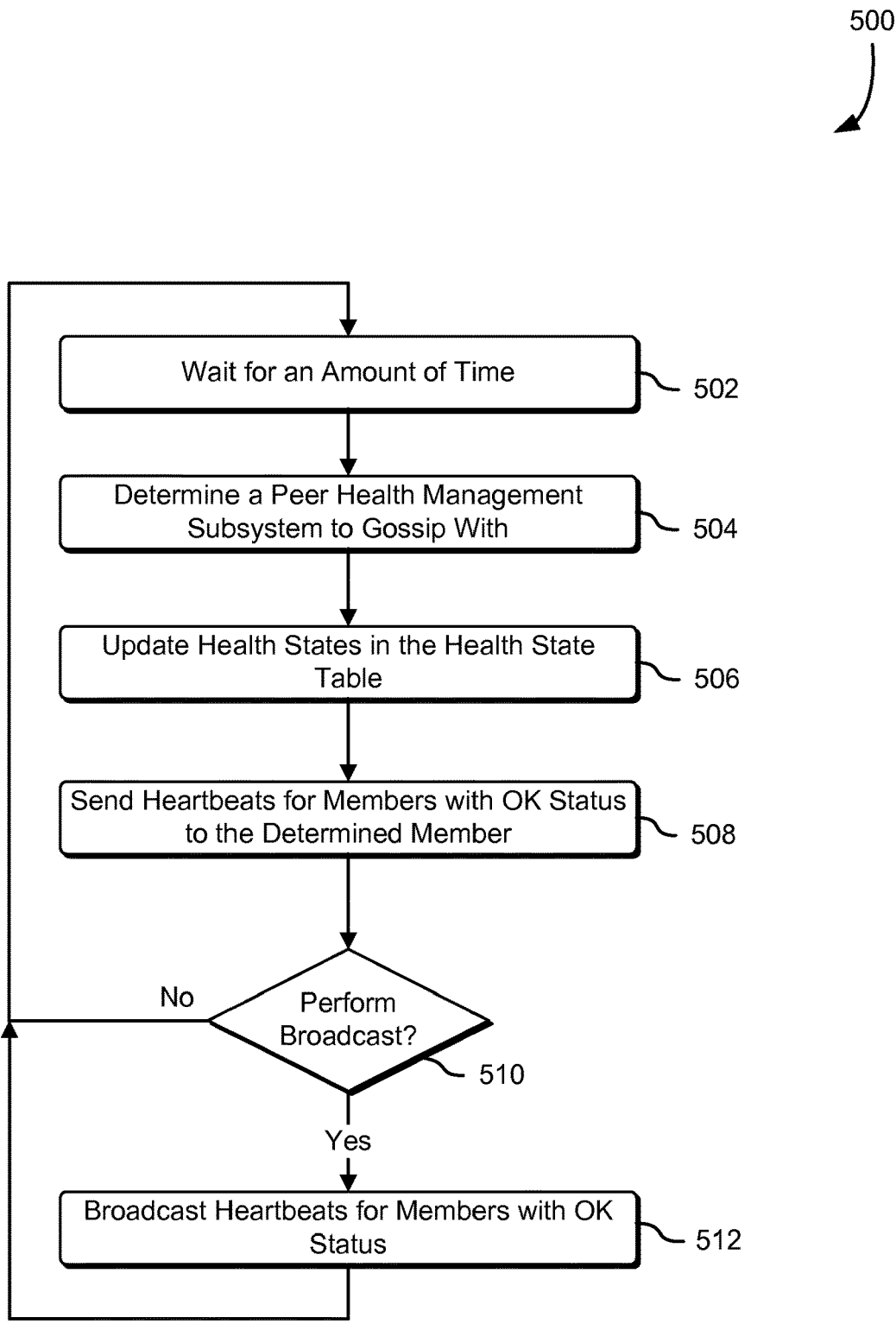
FIG. 5 shows an illustrative example of a process that, when performed by a health reporting module, provides health state information to various health management subsystems in accordance with an embodiment.

FIG. 5 shows an illustrative example of a process that, when performed by a health reporting module, provides health state information to various health management subsystems in accordance with an embodiment. A process diagram 500 begins at block 502 where a health reporting module waits for an amount of time. The amount of time may be adjusted to vary the periodicity with which the health reporting module gossips with other health management subsystems. At block 504, the health reporting module identifies another health management subsystem to gossip with. In various implementations, a particular health management subsystem is chosen randomly from health state records in a health state table that are not in an incommunicado state. In another implementation, a particular health management subsystem is chosen randomly from a list of health management subsystems called a clique. In yet another implementation, a particular health management subsystem is chosen by sequentially proceeding through the health state records in the health state table. At block 506, the health reporting module causes a health state update module to update the stored health information in the health state table.

At block 508, the health reporting module iterates through the health state records of the health state table, identifying a set of health state records that have an "OK" status value. The identified health state records are used to generate a collection of heartbeat records. In some implementations, a heartbeat record includes a heartbeat value and network address. In another implementation the heartbeat record includes a heartbeat value and heartbeat identifier. The collection of heartbeat records is transmitted to the particular health management subsystem. In some implementations, the collection of heartbeat records is digitally signed with a cryptographic key of the database server or other trusted entity.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In some embodiments, the health reporting module periodically determines 510 whether to broadcast the collection of heartbeat records to a portion of a network. In some implementations, the health reporting module broadcasts the collection of heartbeat records to a portion of the network periodically. In another implementation, the health reporting module broadcasts the collection of heartbeat records after a particular number of non-broadcast transmissions. In yet another implementation, the health reporting module broadcasts the collection of heartbeat records when the number of health state records in the health state table is below a threshold value. When the health reporting module determines 510 not to perform a broadcast operation, execution returns to block 502. When the health reporting module determines 510 to perform the broadcast operation, execution advances to block 512 where the collection of heartbeat records is transmitted via a network broadcast operation. In some implementations, the broadcast operation may be limited to the local subnet.

In various embodiments, combinations of peer-to-peer, multicast, and broadcast transmissions may be used by the health reporting module to transmit the collection of heartbeat records. For example, in some implementations, only peer-to-peer transmissions are used. In another example, peer-to-peer and multicast transmissions are used and broadcast transmissions are not used. In yet another example, the health reporting module broadcasts on more than one network interface.

Various network technologies and protocols may be used to transmit the collection of heartbeat records between health management subsystems. For example, in one implementation, the heartbeat values are transmitted between health management subsystems by sending the information over a TCP/IP connection. In another example, the heartbeat values are transmitted between health management subsystems by sending the health information in a UDP packet.

Figure 6:
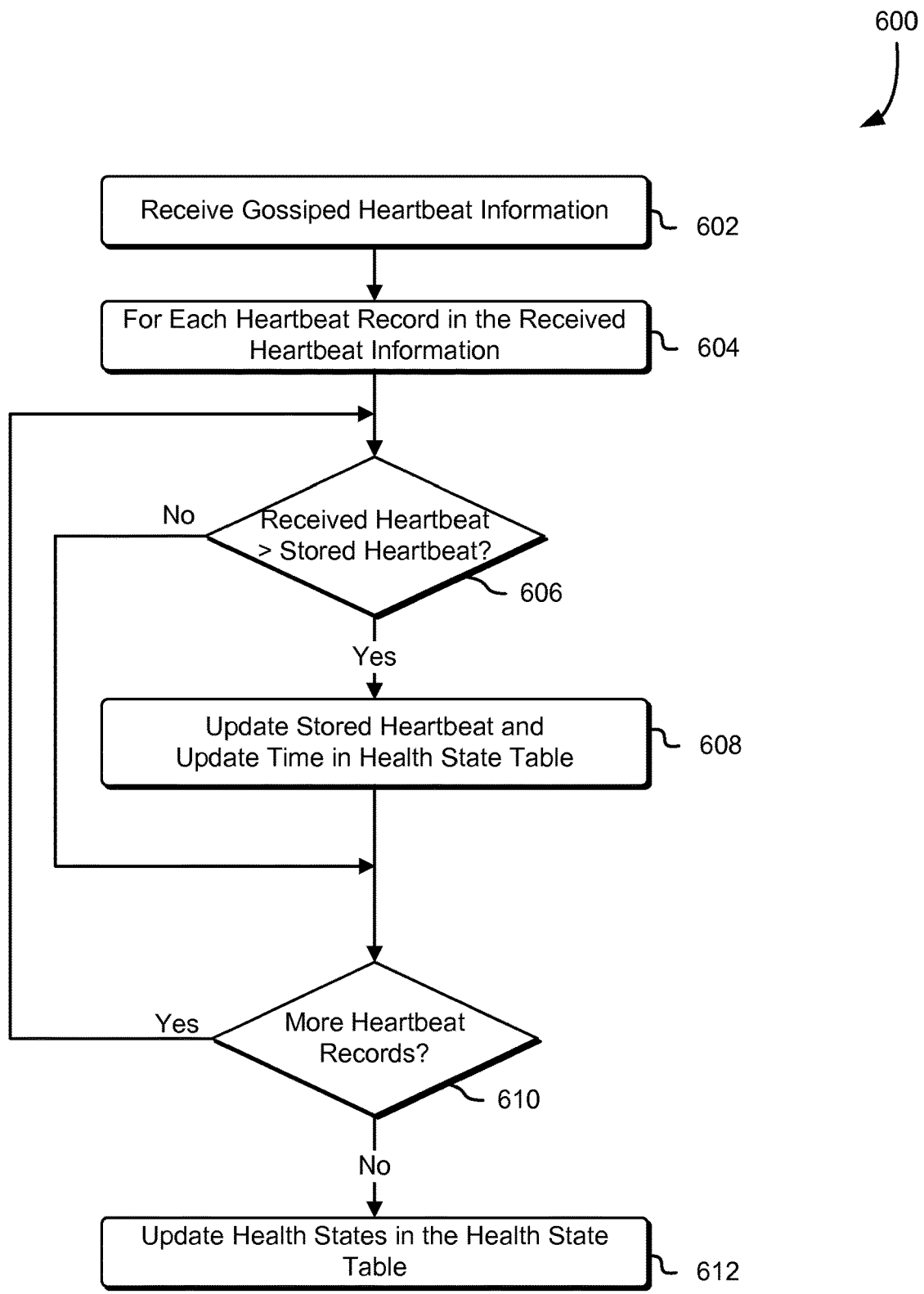
FIG. 6 shows an illustrative example of a process that, when performed by a health monitoring module, processes received health information from one or more reporting health management subsystems in accordance with an embodiment.

FIG. 6 shows an illustrative example of a process that, when performed by a health monitoring module, processes received health information from one or more reporting health management subsystems in accordance with an embodiment. A process diagram 600 illustrates a process that begins at block 602, where a health monitoring module receives heartbeat information from another health management subsystem. In various implementations, the health state information includes a number of heartbeat records. Each heartbeat record can include a network address of a particular health management subsystem, and a heartbeat value. In another implementation, each heartbeat record includes a heartbeat value, and an identifier for each heartbeat value. In some implementations, the health state information is received via a computer network, and is contained in a UDP packet addressed to a particular TCP/IP port number assigned to the health monitoring module. In another implementation, the health state information is contained in a UDP packet broadcast by a sender. In yet another implementation, the health state information is received over a TCP connection established by the other health management subsystem to the health monitoring module. In yet another implementation, the health state information is received via interprocess communication ("IPC") from another health management subsystem operating on the same physical computer.

At block 604, the health monitoring module initiates a loop that iterates through each heartbeat record in the received health state information. Each heartbeat record includes an integer heartbeat value, and either a network address or a heartbeat identifier. For each received heartbeat record, the local health state table is searched to find a health state record that matches the network address or the heartbeat identifier. When a matching health state record is not found, a new health state record is created in the local health state table, the new health state record having a heartbeat value and network address of the received heartbeat record. The update time of the new health record is set to the current time. When the health monitoring module determines 606 that the received heartbeat value is greater than the heartbeat value in the matching health state record, the matching health state record is updated 608 with the received heartbeat value, and the update time of the matching health state record is set to current time. For example, when the local health state table includes a particular health state record having a heartbeat value of 50, and a network address of 128.104.38.49, and the health monitoring module receives a heartbeat record that has a heartbeat value of 52, and a network address of 120.104.38.49, the heartbeat value stored in the particular local record will be updated to 52, and the update time for the particular local record in the local health state table will be set to the current time.

At decision block 610, the health monitoring module determines whether the heartbeat records in the received health information have been processed. When there are more received heartbeat records to be processed, execution returns to decision block 606, and the health monitoring module processes the next heartbeat record. When there are no more received heartbeat records to be processed, execution advances to block 612 where the health monitoring module causes the health state update module to update the locally stored health state table.

In some embodiments, when the health monitoring module receives health information via a computer network, the health monitoring module captures the source network address of the transmission. The source network address is added to a stored collection of health management subsystem addresses. A health reporting module can utilize the stored collection of health management subsystem addresses when determining a peer health management subsystem to transmit health information to.

Figure 7:
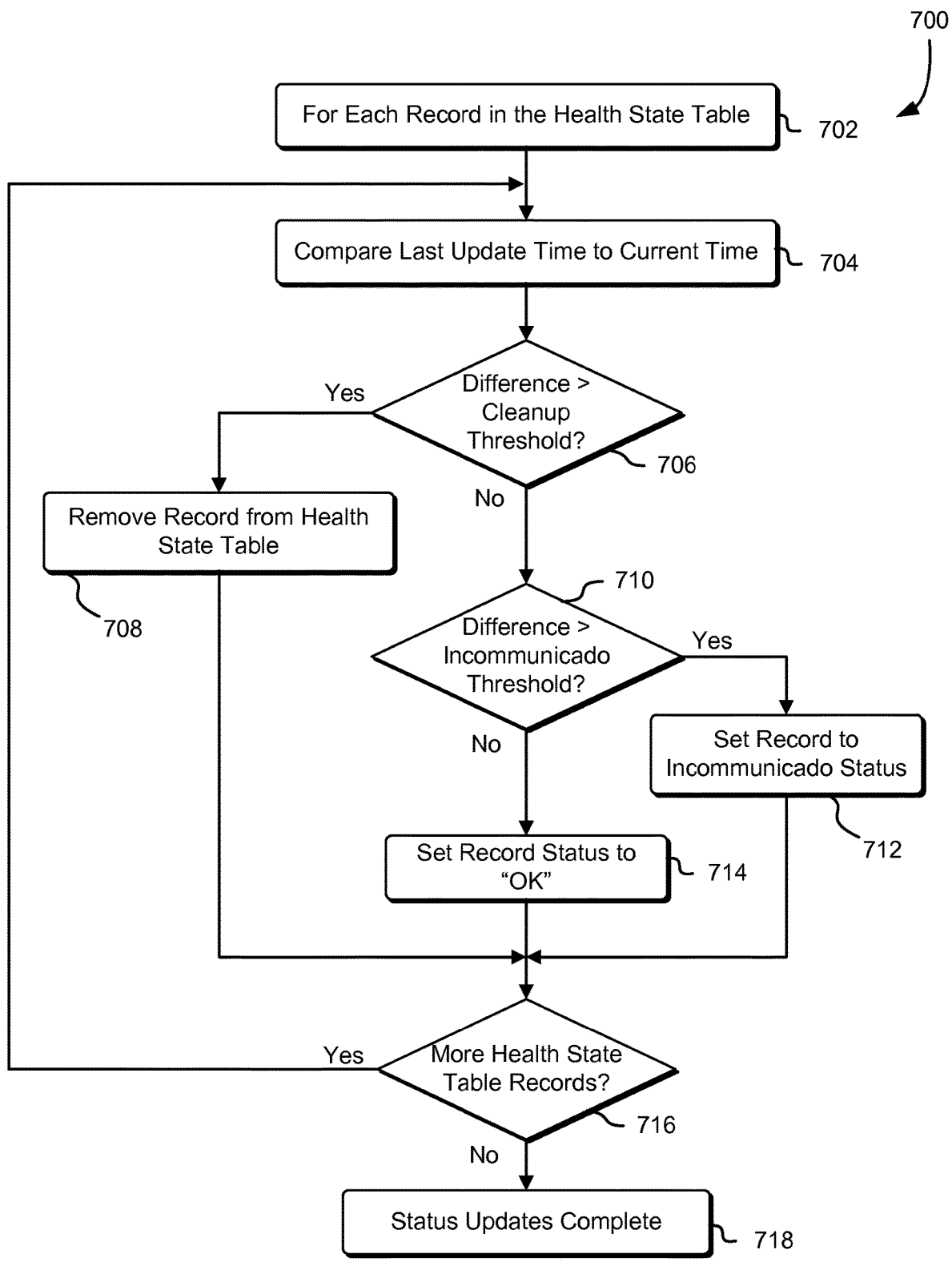
FIG. 7 shows an illustrative example of a process that, when performed by a health state update module, updates stored health information in accordance with an embodiment.

FIG. 7 shows an illustrative example of a process that, when performed by a health state update module, updates stored health information in accordance with an embodiment. A process diagram 700 illustrates a process that begins with a loop that is initiated at block 702. The health state update module iterates through each health state record in a health state table. Each health state record includes at least an update time, a heartbeat value, and an identifier for the heartbeat such as a network address. The health state update module compares 704 the update time of each health state record with the current time. When the health state update module determines 706 that the difference between the update time and the current time is greater than a removal threshold, the health state update module removes 708 the associated health state record. When the health state update module determines that the difference between the update time and the current time is not greater than the removal threshold, execution proceeds to decision block 710. At decision block 710, when the health state update module determines that the difference between the update time and the current time is greater than an incommunicado threshold, the health state update module sets 712 the status of the associated health state record to "INC" or incommunicado. When the health state update module determines that the difference between the update time and the current time is not greater than the incommunicado threshold, execution advances to decision block 714. At block 714, the health state module sets the status of the associated health state record to "OK" which, in various implementations indicates that replication is functioning properly. At block 716, the health state update module determines whether more records in the health state table remain to be processed. When more records in the health state table remain to be processed, execution returns to block 704, and the health state update module processes the next record in the table. When there are no more health state table records to be processed, execution proceeds to block 718 where the process of updating the health state table is complete. In various embodiments, the removal threshold is at least twice the incommunicado threshold.

Figure 8:
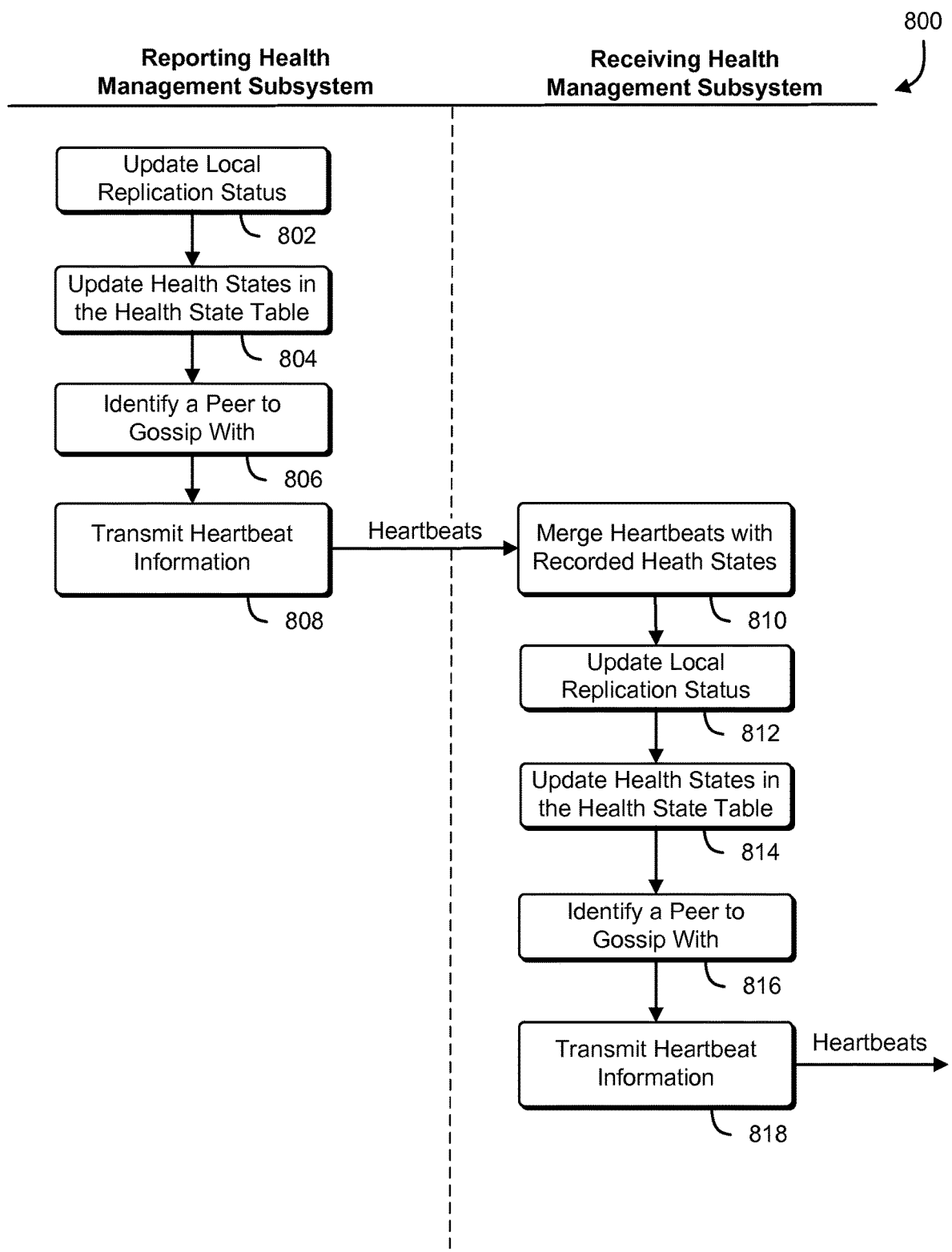
FIG. 8 shows an illustrative example of a gossip-style monitoring protocol, in accordance with an embodiment.

FIG. 8 shows an illustrative example of a gossip-style monitoring protocol, in accordance with an embodiment. A swim diagram 800 illustrates steps performed by a status reporting health management subsystem and a status receiving health management subsystem while monitoring the health of database replication. At block 802, the reporting health management subsystem updates the local replication status. In some embodiments updating local replication status values is accomplished by causing a replication monitoring agent to determine whether replication of the local database is functioning properly. A block 804, the reporting health management subsystem updates the stored health status information. In some embodiments updating the stored health status information is accomplished by causing a health state update module to update the health status information. At block 806, the reporting health management subsystem identifies another health management subsystem to gossip with. In some implementations, the reporting health management subsystem chooses another health management subsystem at random from health management subsystems identified in the health state table. At block 808, the reporting health management subsystem generates a heartbeat message that contains the heartbeat values and identifiers for each record in the local health state table that has a status value of "OK". The heartbeat message is transmitted to the receiving health management subsystem using TCP/IP, interprocess communication, or other networking technology.

When the receiving health management subsystem receives the heartbeat message, the receiving health management subsystem merges 810 received heart beat information into the recipient's local health table. At block 812, the receiving health management subsystem updates a local replication status. In some embodiments updating the local replication status values is accomplished by causing a replication monitoring agent to determine whether replication of the local database is functioning properly. A block 814, the receiving health management subsystem updates the stored health status information. In some embodiments updating the stored health status information is accomplished by causing a health state update module to update the health status information. At block 816, the receiving health management subsystem identifies another health management subsystem to gossip with. In some implementations, the reporting health management subsystem chooses another health management subsystem at random from health management subsystems identified in a local health state table. At block 818, the receiving health management subsystem generates a heartbeat message that contains the heartbeat values and identifiers for each record in the local health state table that has a status value of "OK". The heartbeat message is transmitted to the receiving health management subsystem using TCP/IP, interprocess communication, or other networking technology. In certain situations, the receiving health management subsystem may transmit the updated heartbeat information back to the reporting health management subsystem or to a third different world health management subsystem In various embodiments, the process of updating health information, identifying another health management subsystem, and sending the updated health information to the identified other health management system is repeated by a number of health management subsystems distributed across the computer network. Over time, health information is distributed across a number of health management subsystems so that system administrators can access reasonably up-to-date health information. In a particular implementation, database replication is monitored and reported through a number of health management subsystems so that when a failure occurs, administrators can acquire, from a single source, the replication status for the entire system. For example, in various embodiments, system administrators can generate a report using information in a health status table that shows the health status of each data replication path in a distributed replicated database system.

Figure 9:
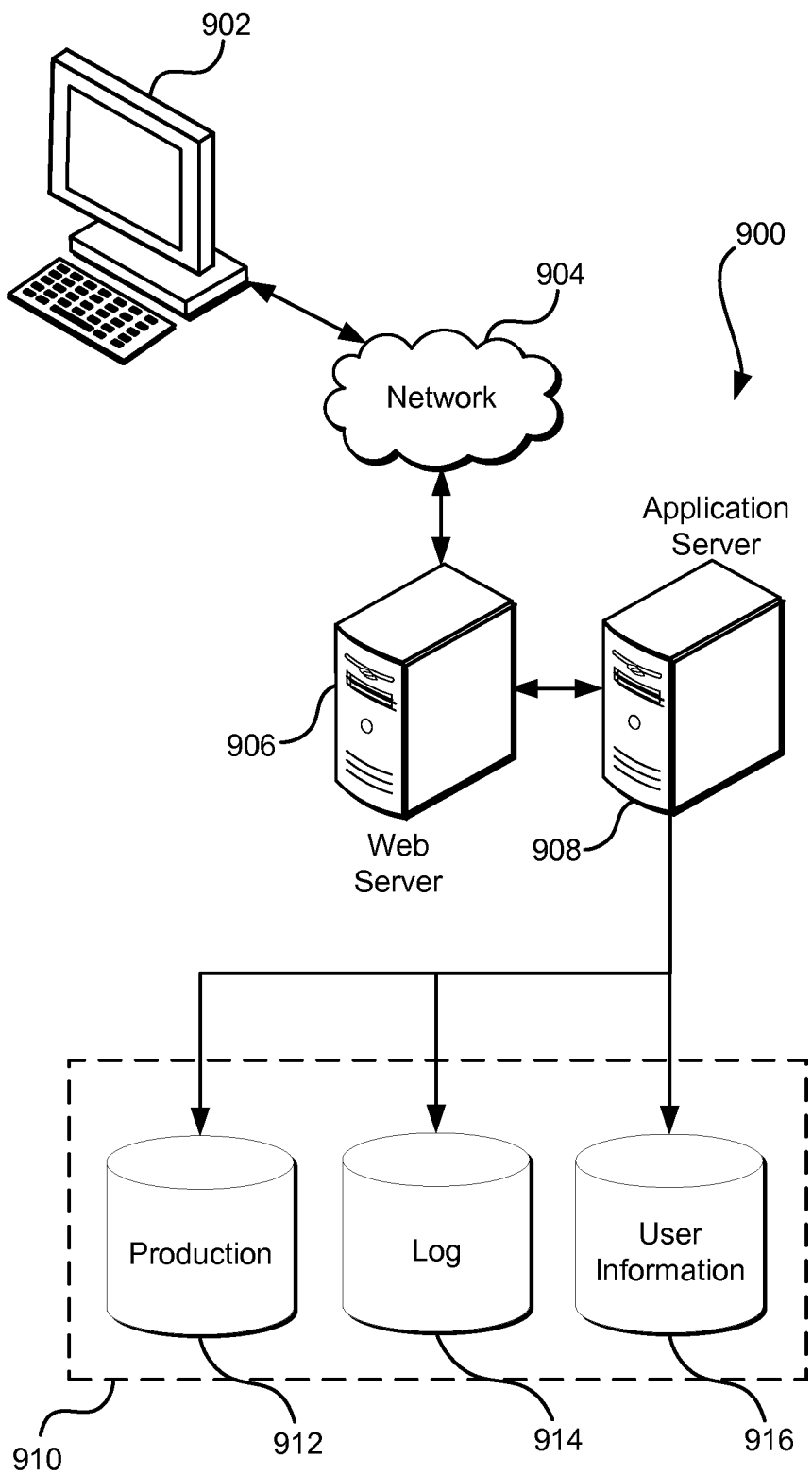
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
measuring operational parameters that are associated with data replication functionality of a first database, the first database having a plurality of records that are selectively obtainable through queries to the first database, the first database storing data that is replicated from a second database;
determining that the first database is properly replicating data from the second database to the first database based at least in part on the operational parameters, including by determining an amount of time taken to successfully replicate the data to the first database from the second database does not exceed a threshold time value;
as a result of determining that the first database is properly replicating data from the second database to the first database, generating a heartbeat indicating proper replication operation performed by the first database;
receiving, via a computer network, a set of heartbeats that include an incoming heartbeat for the first database and the second database, each heartbeat in the set of heartbeats indicating proper operation of replication functionality for an individual database;
updating health-state table entries for the first and second databases in a health-state table, including by updating a last-update time to a time that the incoming heartbeat for the first database and the second database were respectively received;
determining an operational-health state for the first database and the second database based at least in part on the generated heartbeat and the set of heartbeats, the operational-health state indicating an incommunicado state for a particular database when a heartbeat for the particular database has not been updated for a first threshold amount of time;

generating a set of outgoing heartbeats for each database that the operational-health state does not indicate an incommunicado state;

removing an entry associated with the particular database from the health-state table as a result of the particular database persisting in an incommunicado state for at least a second threshold amount of time;

identifying a health management subsystem from a set of peer health management subsystems; and transmitting, via the computer network, the set of outgoing heartbeats to the health management subsystem, the set of outgoing heartbeats allowing the health management system to determine a replication status of the first database and the second database.

2. The computer-implemented method of claim 1, wherein identifying a health management subsystem from a set of peer health management subsystems is accomplished by:

maintaining a collection of network addresses of health management subsystems; and selecting a particular network address from the collection of network addresses using a pseudorandom algorithm.

3. The computer-implemented method of claim 1, further comprising broadcasting the outgoing heartbeats over a portion of the computer network.

4. The computer-implemented method of claim 1, wherein:

measuring the operational parameters of the database includes determining an amount of time to replicate data to the database from another database; and determining that the database is properly replicating data from the second database to the first database is accomplished by comparing the amount of time to a threshold value.

5. A system, comprising at least one computing device that implements one or more services, wherein the one or more services:

determine that data is properly replicating from a master database to a slave database at a rate that does not exceed a threshold time value;

update a heartbeat value for the slave database, the heartbeat value indicating that the data is being properly replicated from the master database to the slave database;

receive a number of incoming heartbeat values, each incoming heartbeat value indicating a status of data replication for an individual slave database;

update health-state table entries for the individual slave databases in a health-state table, including by updating a last-update time to a time that the incoming heartbeat for the individual slaved databases were respectively received;

determine a health state for each slave database based at least in part on the updated heartbeat value and the incoming heartbeat values, the health state indicating a loss of a communication state for each database for which a heartbeat has not been obtained for a first threshold amount of time;

delete an entry associated with a particular database from the health-state table as a result of the particular database indicating a loss of communication for at least a second threshold amount of time;

generate a collection of outgoing heartbeats corresponding to those slave databases having a determined health state not indicating the loss of the communication state; and provide the collection of outgoing heartbeats to another service.

6. The system of claim 5, wherein determining that data is properly replicating from a master database to a slave database is accomplished at least in part by:

measuring an amount of data-replication delay for data replicated from a master database to the slave database; and determining that the measured amount of data-replication delay is less than a threshold value.

7. The system of claim 5, wherein determining that data is properly replicating from a master database to a slave database is accomplished at least in part by:

measuring an amount of data-replication delay for each replicated data object of a plurality of replicated data objects that are replicated from a plurality of master database servers to the slave database; and comparing the amount of data-replication delay for each replicated data object of the plurality of replicated data objects to a particular threshold value associated with each replicated data object of the plurality of replicated data objects.

8. The system of claim 5, wherein updating the heartbeat value for the slave database is accomplished at least in part by incrementing a stored integer value, and recording a time when the heartbeat was updated.

9. The system of claim 5, wherein a network address of a health management subsystem is received with each incoming heartbeat value of the number of incoming heartbeat values.

10. The system of claim 5, wherein the health state for a slave database is determined, at least in part, by:

determining an amount of time since receiving an updated heartbeat value for the slave database; and determining that the slave database is not operating properly when the amount of time exceeds a threshold value.

11. The system of claim 5, wherein incoming heartbeat values are received via a TCP connection.

12. The system of claim 5, wherein determining that data is properly replicating from a master database to a slave database is accomplished at least in part by:

writing a particular value to a data cell on a remote master database;

as a result of writing a particular value to the data cell, recording a replication-start time;

determining that the data cell on the remote master database is replicated to the slave database;

as a result of determining that the data cell on the remote master database is replicated to the slave database, comparing the replication-start time to a current time; and determining that replication functionality is operating properly when a difference between the replication-start time and the current time is less than a threshold amount of time.

13. A non-transitory computer-readable storage medium having stored thereon executable instructions that, as a result of being executed by one or more processors of a computer system, cause the computer system to at least:

determine that a database is receiving replicated data from a master database, the database being a read replica of the master database;

as a result of determining that the database is replicating data at a rate that does not exceed a threshold time value, update a heartbeat value in a health-state table, the heartbeat value generated in response to determining that the database is replicating the data from the master database;

update health-state table entries for individual databases in the health-state table, including by updating a last-update time to a time that an incoming heartbeat for the individual databases are respectively received;

receive an incoming gossip message that includes a heartbeat value and a heartbeat identifier for the individual databases;

update the health-state table based at least in part on the gossip message and the incoming gossip message, the health-state table indicating loss of communication with a database for which a heartbeat has not been obtained within a first threshold amount of time;

delete an entry associated with a particular database from the health-state table as a result of the particular database indicating a loss of communication for at least a second threshold amount of time;

generate, based at least in part on information stored in the health-state table, an outgoing gossip message that includes a heartbeat for each database that is properly replicating data from the master database; and send the outgoing gossip message over a computer network.

14. The non-transitory computer-readable storage medium of claim 13, wherein determining that the database is replicating data from the master database is accomplished at least in part by comparing a current time to a value contained in a replication timestamp data cell.

15. The non-transitory computer-readable storage medium of claim 13, wherein the health-state table includes a number of health records, each health record of the number of health records having a network address field, an integer heartbeat field, and an update time field.

16. The non-transitory computer-readable storage medium of claim 15, wherein:

each health record of the number of health records further includes a health-state field; and the value of the health-state field is determined at least in part by comparing the value of the update time field to a current time.

17. The non-transitory computer-readable storage medium of claim 15, wherein determining that the database is replicating data from the master database is accomplished at least in part by:

determining a replication-expiration time by adding a threshold amount of time to a current time;

writing the replication-expiration time to a master replication timestamp data cell on the master database;

reading the replication-expiration time from a slave replication timestamp data cell;

determining whether the replication-expiration time is later than the current time; and as a result of determining that the replication-expiration time is later than the current time, determining that the database is replicating data from the master database.

18. The non-transitory computer-readable storage medium of claim 17, wherein a particular health record is placed in an incommunicado state prior to being removed from the health-state table.

19. The non-transitory computer-readable storage medium of claim 13, wherein the incoming gossip message is received via inter-process communication.

20. The non-transitory computer-readable storage medium of claim 13, wherein the executable instructions that, as a result of being executed by one or more processors of the computer system, further cause the computer system to at least:

determine that the health-state table includes a number of records that is less than a threshold number of records; and as a result of determining that the health-state table includes the number of records that is less than the threshold number of records, broadcast the outgoing gossip message over the computer network.

* * * * *